United States Patent [19]
Rourke et al.

[11] Patent Number: 5,995,721
[45] Date of Patent: Nov. 30, 1999

[54] DISTRIBUTED PRINTING SYSTEM

[75] Inventors: John L. Rourke, Fairport; Steven A. Graham, Victor, both of N.Y.

[73] Assignee: Xerox Corporation, Stamford, Conn.

[21] Appl. No.: 08/876,419

[22] Filed: Jun. 16, 1997

Related U.S. Application Data

[60] Provisional application No. 60/028,631, Oct. 18, 1996.

[51] Int. Cl.$^6$ .................................................. G06F 15/00
[52] U.S. Cl. ........................... 395/114; 395/115; 395/112
[58] Field of Search .................................... 395/114, 112,
395/109, 110, 101, 500, 102, 117, 115,
116, 500.44, 500.45, 500.46, 500.48, 500.49;
358/407, 408, 402, 467, 468, 404, 444

[56] References Cited

U.S. PATENT DOCUMENTS

| | | | |
|---|---|---|---|
| 4,947,345 | 8/1990 | Paradise et al. | 364/519 |
| 5,129,639 | 7/1992 | DeHority | 270/1.1 |
| 5,287,194 | 2/1994 | Lobiondo | 358/296 |
| 5,287,434 | 2/1994 | Bain et al. | 395/101 |
| 5,373,350 | 12/1994 | Taylor et al. | 355/202 |
| 5,450,541 | 9/1995 | Rourke et al. | 395/155 |
| 5,450,571 | 9/1995 | Rosekrans et al. | 395/500 |
| 5,467,434 | 11/1995 | Hower, Jr. et al. | 395/114 |
| 5,574,831 | 11/1996 | Grenda | 395/104 |
| 5,596,416 | 1/1997 | Barry et al. | 358/296 |
| 5,687,303 | 11/1997 | Motamed et al. | 395/117 |

OTHER PUBLICATIONS

Morgan, Paul F., "Integration of Black Only and Color Printers," Nov./Dec. 1991, vol. 16., No. 6, pp. 381–383.

*Primary Examiner*—Edward L. Coles
*Assistant Examiner*—Dov Popovici
*Attorney, Agent, or Firm*—Gary B. Cohen

[57] ABSTRACT

There is provided a document processing system including at least one document reproduction apparatus and managing on-demand output of a document job. The document job is characterized by a set of job attributes with each job attribute relating to a manner in which the document job is to be processed by the document processing system. The document processing system, which further includes a document server for managing conversion of the document job into the on-demand output, includes: a plurality of queues mapped to a plurality of document processing subsystems, each of the plurality of queues including a set of queue attributes characterizing the extent to which each document processing subsystem mapped to one or more of the plurality of queues is capable of processing a job portion delivered to the one or more queues. The document processing system further includes a queue utility communicating with the plurality of queues. The queue utility compares the set of job attributes and each set of queue attributes to generate a set of information corresponding the set of job attributes with those queues, among the plurality of queues, that are capable of completely processing at least a portion of the document job. In practice, at least a portion of the document job is corresponded with one of the plurality of queues based on the set of information generated by the queue utility.

10 Claims, 11 Drawing Sheets

Typical ASCII Job Ticket

| | |
|---|---|
| %XRXbegin: | 1.31 |
| %XRXdisposition: | PRINT |
| %XRXsenderName: | |
| %XRXtitle: | PostScript File |
| %XRXcopyCount: | 1 |
| %XRXpaperType-size: | 216  279 |
| %XRXdocumentPaperColors: | white |
| %XRXpaperType-opacity: | opaque |
| %XRXpaperType-preFinish: | Plain 0 0 |
| %XRXrecipientName: | |
| %XRXrequirements: | simplex |
| %XRXsignature: | FALSE |
| %XRXsourceFile: | . . . |
| %XRXdeleteSource: | FALSE |
| %XRXxImageShift: | 5 |
| %XRXyImageShift: | 0 |
| %XRXend | |

| | Job Level | | | Page Level | | | Image Level | | | |
|---|---|---|---|---|---|---|---|---|---|---|
| | J1 | J2 | ··· | JN | P1 | P2 | ··· | PN | I1 | I2 | ··· | IN |
| Queue 1 | X | X | ··· | | X | | ··· | X | | X | ··· | |
| Queue 5 | | | | | | X | ··· | | X | | ··· | |
| Queue 9 | | | | | | | | | X | X | ··· | |
| ⋮ | ⋮ | | | | ⋮ | | | | ⋮ | | | |
| Queue N | X | | ··· | X | | X | ··· | | | | ··· | X |

| | J1 | J3 | J5 | P4 | P6 | I2 | I5 | I7 |
|---|---|---|---|---|---|---|---|---|
| Job | X | X | X | X | X | X | X | X |
| Queue 2 | X | X | | | X | | X | X |
| Queue 7 | | | X | X | | X | | |

DISTRIBUTED PRINTING SYSTEM

Priority is claimed to Provisional Application No. 60/028,631, filed Oct. 18, 1996.

BACKGROUND

This invention relates generally to a distributed printing system with a plurality of document processing subsystems and, more particularly, to a system which examines the attributes of a document for the purpose of delivering one or more portions of the document to one or more of the document processing subsystems on the basis of the examination of the attributes.

In accordance with a standard model of network printing, a job is developed at a workstation and delivered to a printer, by way of a server, for the purpose of executing the job. An example of such standard network printing modeling is disclosed in U.S. Pat. No. 5,493,634 to Bonk et al. (Issued: Feb. 20, 1996). This printing model is appropriate for those situations in which the printer is well suited for printing the job in accordance with certain criteria required by the system user. For example, if the user expects to have a selected number of prints generated within a certain time frame at a selected location, and such criteria is met at the printer, then the user is satisfied. If this criteria cannot be met, however, a certain degree of customer dissatisfaction may be ensured.

To avoid this sort of customer dissatisfaction, a distributed printing model of the type disclosed in U.S. Pat. No. 5,287,194 to Lobiondo ("Lobiondo") (Issued: Feb. 15, 1994) has been proposed. Lobiondo discloses a printshop management scheduling routine and system which provide optimum scheduling of print jobs on a network. The scheduling routine utilizes the total complex of printers available at a local location and/or remote locations to allocate and complete print jobs based on a plurality of criteria, including requested completion time for the project. If requested completion time does not allow printing of the print job by a sole printer, the print job is allocated to a plurality of available printers, each printing a portion of the complete print job.

Examples of "job type criteria" referred to in Lobiondo may include "selection of media format, size, number of copies, completion time, etc." Various systems suggest the advantage of splitting up a job and sending the resulting portions to a plurality of printers. In the October, 1995 edition of the Hardcopy Observer (published by Lyra Research, Inc.), at p. 15, a multiple printer arrangement, known as "MicroPress" is described, in part, as follows:

> Like any spooler, PressDirector's "MicroSpool" spooler takes files in, stores them until the RIP is free and sends them on to the printer. But T/R systems has added many unique functions to MicorSpool, the primary purpose of which is to make multiple desktop color lasers act like a big laser.
>
> The key MicroSpool feature is called "electronic collation." After the software rasterizes a job, the resulting pages are stored as compressed bitmaps on the system's hard drive. Then a "parsing" process sends the pages out to the available engines in exactly the right sequence so that when the printing is done, the stacks produced by each engine can be placed on top of each other to create a complete multi-copy job with separator sheets inserted between copies. "The software looks at the job and parses it so that all four engines start and finish at the same time," says Daly. "It's very involved technically. There's a big, big algorithm."

A product similar to the above-described MicroPress is referred as follows in the December, 1995 edition of the Hardcopy Observer, at p. 69:

> The product that Entire has developed is called the Image Manager. Conceptually, the Image Manager is very similar to the T/R Systems MicroPress (*Observer* October, 1995) which uses a PC-based server to drive multiple Canon desktop color laser engines as if they were a single high-speed virtual machine. The Entire technology does the same thing, except that it is designed to drive multiple HP LaserJet 5Si monochrome lasers.

In contrast to the above-discussed model in which the job appears to be partitioned on the basis of at least one job level attribute, e.g. prints produced per unit time, a Xerox Disclosure Journal article to P. F. Morgan (vol. 16, No. 6, November/December 1991) entitled "Integration of Black Only and Color is Printers" contemplates an approach in which portions of a job, developed on the basis of page level information, are delivered to a plurality of printers. In particular, in the approach disclosed by Morgan, a job with black/white and color pages is provided. The job is separated on the basis of color so that the black/white part of the job is delivered to a black/white printing system and the color part of the job is delivered to a full process color machine. Preferably, color prints, corresponding with the color part of the job, are delivered to a sheet inserter so that the color prints can be inserted into a stream of black/white prints corresponding with the black/white part of the job.

It is readily understood by those skilled in the art of inserter design that combining insert sheets into a stream of prints requires a scheduling routing of the type disclosed by U.S. Pat. No. 5,489,969 to Soler (Issued: Feb. 6, 1996). More particularly, the Soler patent, when read in conjunction with the Morgan disclosures teaches a system in which a job stream with "holes" or skipped pitches is developed by way of a suitable scheduling routine. In turn, it follows that sheets of ordered stock, such as sheets of a stack of color prints, would be insertable into the stream to accomplish one of the objects of the Morgan approach.

Various prior art teachings are believed to complement the approach disclosed by Morgan. For example, it is known that color can be achieved in printing with various color related systems. In one aspect of color reproduction, black/white prints are highlighted with color through use of tri-level xerography of the type disclosed in U.S. Pat. No. 4,078,929 to Gundlach (Issued Mar. 14, 1978). As disclosed by U.S. Pat. No. 5,524,181 to Sung et al., it is understood that tri-level xerography can be implemented in a network printing environment. In another aspect of color reproduction, U.S. Pat. No. 5,373,350 to Taylor et al. (Issued Dec. 13, 1994) discloses a printer which combines technologies of xerographic and thermal ink jet printing into a single unit which is capable of producing prints with text and color graphics, i.e. accent colored prints.

Both the above-mentioned Lobiondo patent and the Morgan article directly or indirectly address the concept of classifying a job in accordance with one or more attributes of the job. Describing a job in terms of job level and/or page level attributes is considered, in some detail, by the disclosure of U.S. Pat. No. 5,181,162 to Smith et al. (Issued: Jan. 19, 1993). The Smith patent discloses an object oriented document management and production system in which documents are represented as collections of logical components or "objects" that may be combined and physically mapped into a page-by-page layout. Stored objects are organized, accessed and manipulated through a database management system.

The manipulation of objects or images with respect to one or more selected pages is further taught by U.S. Pat. No. 5,450,541 to Rourke et al. (Issued Sep. 12, 1995). The Rourke patent discloses a printing system in which an image, i.e. bitmap, can be laid out on an electronic page at a predesignated location and thereafter reproduced on a print at a location corresponding with the predesignated location at which it was set during layout. Preferably, the bitmap is obtained from a directory in mass memory of the printing system.

The concept of managing a job on the basis of its attributes is further disclosed in U.S. Pat. No. 5,467,434 to Hower Jr. et al. (Issued: Nov. 14, 1995) and U.S. Pat. No. 5,450,571 to Rosekrans et al. (Issued: Sep. 12, 1995) Each of the Hower and Rosekrans patents illustrate systems which use servers having multiple queue capability. Moreover, U.S. Pat. No. 5,129,639 to DeHority (Issued Jun. 14, 1992) discloses a system which permits interactive communication between a client and a server when the server is unable, because of an attribute mismatch, to fulfill the requirements of the client's job.

The advantage of using one or more queues in a printing process has been demonstrated by U.S. Pat. No. 4,947,345 to Paradise et al. (Issued Aug. 7, 1990). Paradise discloses a system in which copy/print jobs are delivered to an output queue which communicates with a printer while Fax jobs are delivered to a hold queue which communicates with the output queue. In practice, after a certain number of Fax jobs have accumulated in the hold queue, they are delivered to the output queue in such a manner that the Fax jobs are printed ahead of all jobs currently residing in the output queue.

It is believed that the criteria used to split a job in the Lobiondo patent is directed, in great part, toward job level information rather than page level information. It is further believed that all of the above-described systems in which multiple job portions are sent to multiple printers, except the system disclosed by the Morgan article, appear to teach away from partitioning a job into groups of noncontiguous pages since to do so would lead to problems in collation. Partitioning a job into groups of noncontiguous pages may be required, however, in situations where certain attributes recur sporatically throughout the job. For example, a job may comprise a book with chapters in which a merge item is to be applied at the beginning of each chapter.

While the Morgan article accommodates for partitioning of a job into groups on a noncontiguous basis, it teaches a sorting technique that is believed to be far less than optimum in that it requires sorting at a scanning device. This style of sorting not only requires dedicated hardware, but the time of an operator who is required to expend time in operating the scanning device. It would desirable to provide a system possessing the capability to comprehend the attributes of a job, at a suitable front end or server, and match the job with one or more document processing units based on such comprehension.

The present invention employs network capability to achieve various advantageous ends. The following discussion is intended to provide a background for any appropriate network implementation required by the disclosed embodiment below:

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), U.S. Pat. Nos. 5,181,162, 5,220,674, 5,247,670; 4,953,080 and 4,821,107. Further by way of background, some of the following Xerox Corporation U.S. patents also include examples of networked systems with printers: 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, and Canon U.S. Pat. No. 4,760,458 and Japan. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" ". . . Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Information System, A New Personal Computer . . . "; "Xerox System Integration Standard Printing Protocol XSIS 118404", April 1984; "Xerox Integrated Production Publishers Solutions: . . . " Booklet No. "610P50807" "November, 1985"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book" , Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox® Corporation "9700 Electronic printing System"; the "VP Local Laser Printing" software application package, which, together with the Xerox® "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart®" systems, first announced Sep. 13, 1990, are also noted.

Current popular commercial published "systems software" including LAN workstation connections includes Novell® DOS 7.0, "Windows®" NT 3.1, and IBM OS/2 Version 2.1.

Disclosures of all of the patents cited and/or discussed above in this Background are incorporated herein by reference.

SUMMARY OF THE INVENTION

In accordance with one aspect of the present invention, there is provided a document processing system including at least one document reproduction apparatus and managing on-demand output of a document job. The document job is characterized by a set of job attributes with each job attribute relating to a manner in which the document job is to be processed by the document processing system. The document processing system, which further includes a document server for managing conversion of the document job into the on-demand output, comprises: a plurality of queues mapped to a plurality of document processing subsystems, each of the plurality of queues including a set of queue attributes characterizing the extent to which each document processing subsystem mapped to one or more of said plurality of queues is capable of processing a job portion delivered to the one or more queues; a queue utility communicating with said plurality of queues and comparing the set of job attributes and each set of queue attributes to generate a set of information corresponding the set of job attributes with those queues, among said plurality of queues, that are capable of completely processing at least a portion of the document job; and said at least a portion of the document job being corresponded with one of said plurality of queues based on the set of information generated by said queue utility.

In accordance with another aspect of the present invention there is provided a document processing system including at least one document reproduction apparatus and managing on-demand output of a document job. The document job is characterized by a set of job attributes with each job attribute relating to a manner in which the document job is to be processed by the document processing system. The document processing system, which further includes a document server for managing conversion of the document job into the on-demand output, comprises: a first set of one or more queues mapped to a first set of document processing subsystems, each of said first set of one or more queues including a set of queue attributes characterizing the extent to which each document processing subsystem mapped to one or more of said first set of queues is capable of processing a job portion delivered to the one or more queues of said first set of queues, and each of the first set of document processing subsystems being part of a first family of document processing subsystems; a second set of queues mapped to a second set of document processing subsystems, each of said second set of queues including a set of queue attributes characterizing the extent to which each document processing subsystem mapped to one or more of said second set of queues is capable of processing a job portion delivered to the one or more queues of said second set of queues, and each of the second set of document processing subsystems being part of a second family of document processing subsystems; a queue utility communicating with said first and second sets of queues and comparing the set of job attributes with each set of queue attributes to generate a set of information corresponding the set of job attributes with those queues, among said first and second sets of queues, that are capable of completely processing at least a portion of the document job; and on the basis of the set of information generated by said queue utility, a first portion of the job being corresponded with said first set of queues and a second portion of the job being corresponded with said second set of queues.

DESCRIPTION OF PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
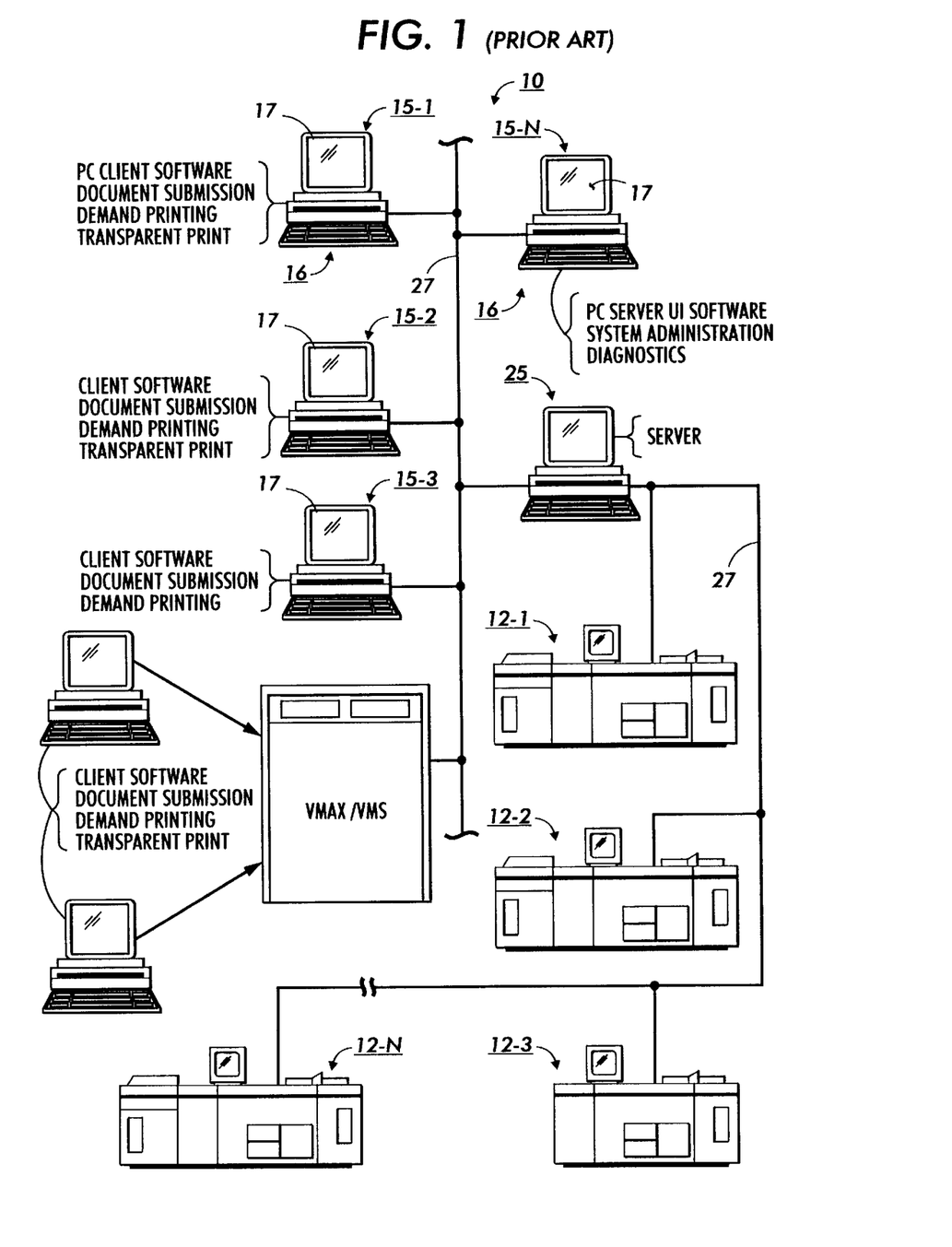
FIG. 1 is a schematic, elevational view of a network printing network printing system.

Referring to FIG. 1, there is shown a network document processing system 10 of the type adapted to incorporate the present invention. Processing system 10 comprises a plurality of printers 12-1, 12-2,12-3, ... 12-n for processing print jobs and making prints in accordance with the job programming instructions for each job printed. Each of printers 12-1, 12-2, 12-3, 12-n may be any suitable printer capable of producing prints on a print media such as paper from video image signals and may, for example, comprise laser printers, ink jet printers, digital copiers, highlight or full process color printers, ionographic printers, combinations of the aforesaid devices, etc. In system 10, where multiple printers are integrated into a network processing system, individual printers typically have different document processing capabilities as will appear. As used herein, printers 12-1, 12-2, 12-3, ... 12-n include virtual printers of the type disclosed by U.S. Pat. Nos. 5,371,837 and 5,450,571.

System 10 provides print processing for various workstations or clients 15-1,15-2, 15-3, ... 15-n. Clients 15-1,15-2, 15-3, ... 15-n, which may be remote and/or on site, are operatively coupled to printers 12-1, 12-2,12-3, 12-n through server 25 as will appear. As will be appreciated, while only one server and a limited number of document processing apparatuses are shown in FIG. 1, the preferred embodiment contemplates the use of as many servers and document processing units as required to meet the demands of the users of the system. Clients provide the electronic documents that are the source of the print jobs and for this purpose individual ones or all of clients 15-1,15-2, 15-3, . . . 15-n may have a document scanner, disk input, keyboard, fax, etc. for generating the electronic documents that comprise the job to be printed. Clients 15-1,15-2, 15-3, . . . 15-n have a User Interface (UI) 16 with interactive screen 17 enabling programming selections for print jobs to be made, screen 17 displaying the various programming selections available in the form of a job ticket as will appear. Printers 12-1, 12-2,12-3, . . . 12-n, clients 15-1,15-2, 15-3, . . . 15-n, and server 25 are operatively interconnected by network or communication channels 27.

Figure 2:
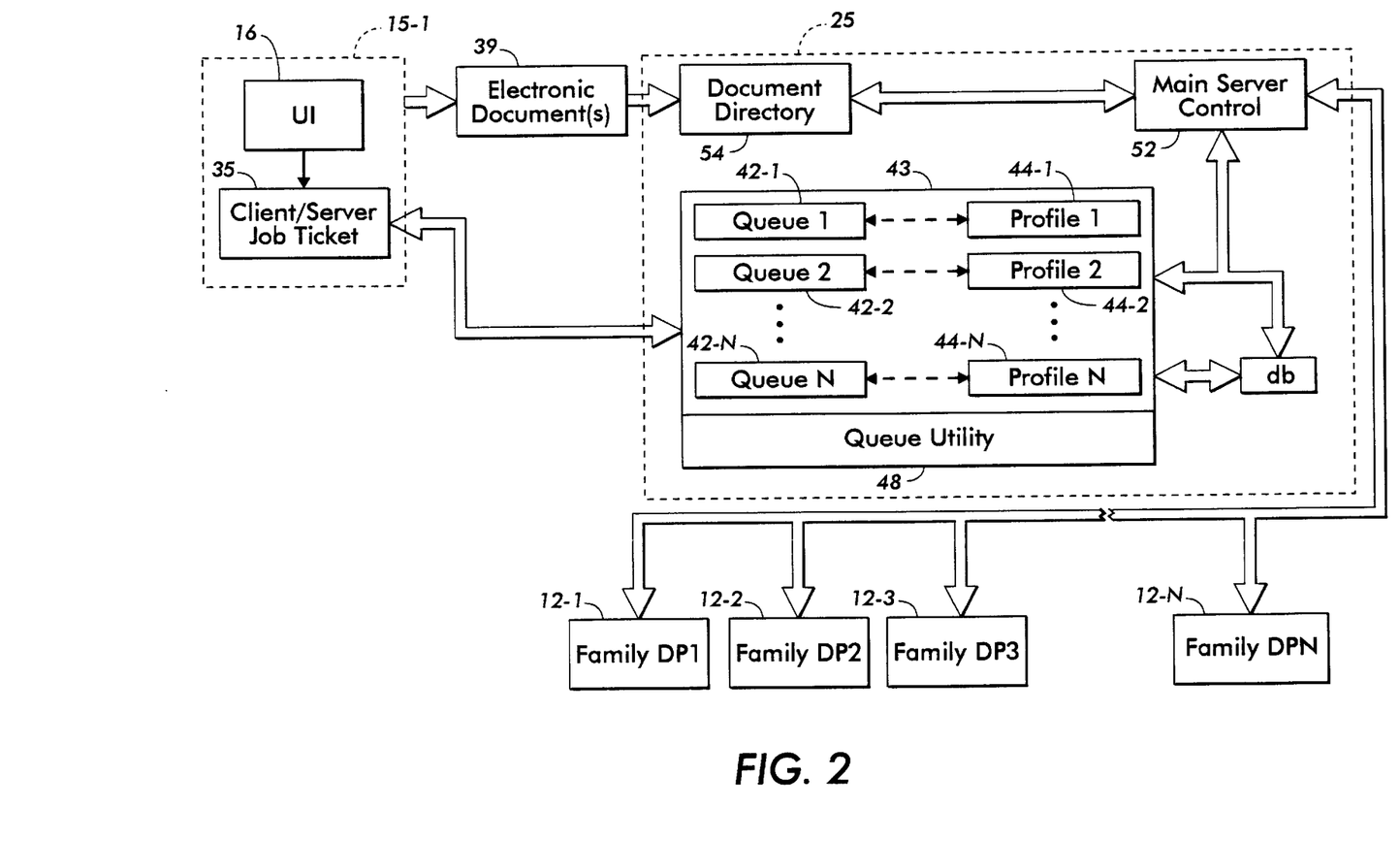
FIG. 2 is a partial, schematic, block diagram of the network printing system of FIG. 1.

Referring to FIG. 2, the relationship of a single client, such as client 15-1, to the server 25 is shown in further detail. In the illustrated embodiment of FIG. 2, the client 15-1 inclelectronicf the UIs 16 and an electronic job ticket 35, which job ticket 35 permits the user to program a print job for transmission to the server 25. In general, the job ticket 35 includes information relating to attributes that characterize a document job. More particularly, the attributes typically include job level attributes (e.g. set quantity, copy count, finishing requirements, plex and page numbering), page level attributes (e.g. stock color separation information, image quality, reduction/enlargement and sides to be imaged), and image level attributes (e.g. size of image, color of image, location of image relative to a page). In one example, electronic document(s) 39, which includes image and attribute related information, is transmitted from the client 15-1 to the server 25.

Figure 3:
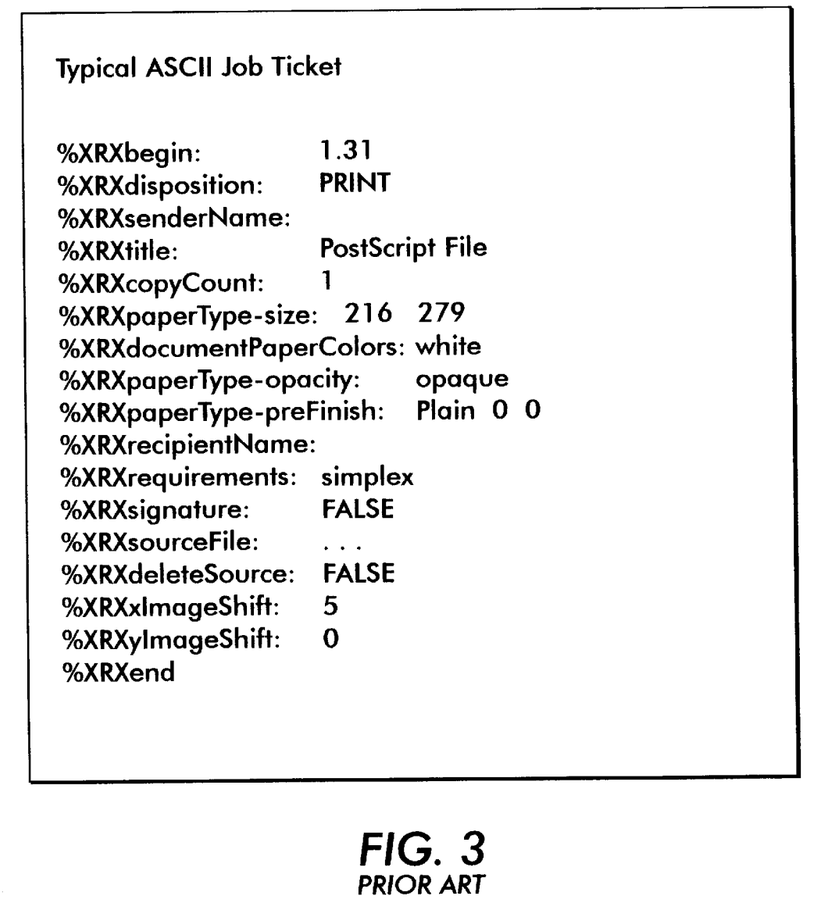
FIG. 3 is a representation of a format for an electronic job ticket.

Referring to FIG. 3, the client/server job ticket 35 may assume an ASCII format. Additionally, by employment of suitable client UI interface dialog software, print job selections may be displayed on the screen 17 of the UI 16 so that the user can be apprised of which printing selections are available for programming a print job. The disclosures of U.S. Pat. Nos. 5,450,571 and 5,467,434 describe, in detail, arrangements suitable to generate job tickets for network printing systems employing multiple queues.

Figure 4:
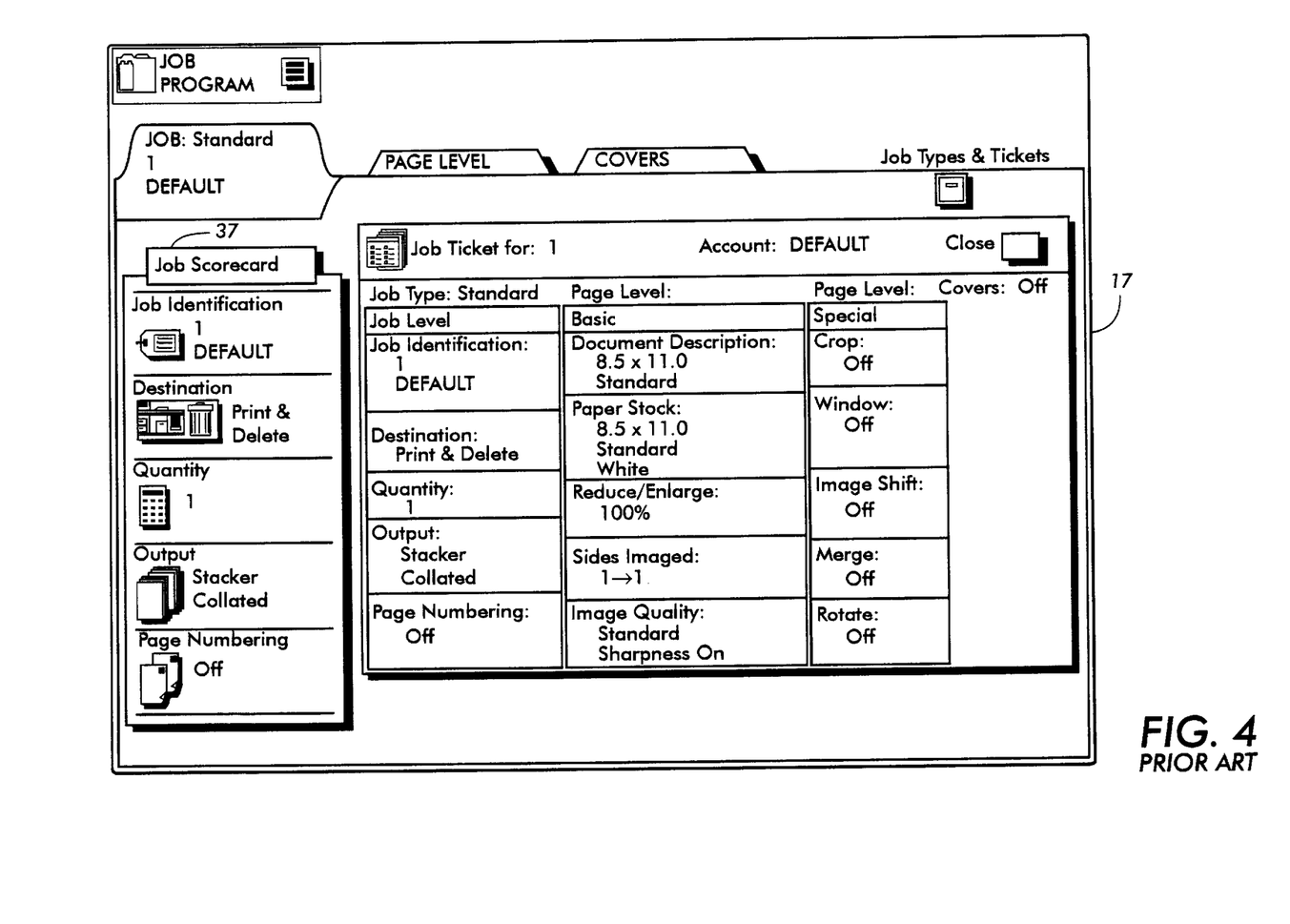
FIGS. 4 and 5 are representations of job tickets used to program portions of a print job as displayed on a client screen.
Figure 5:
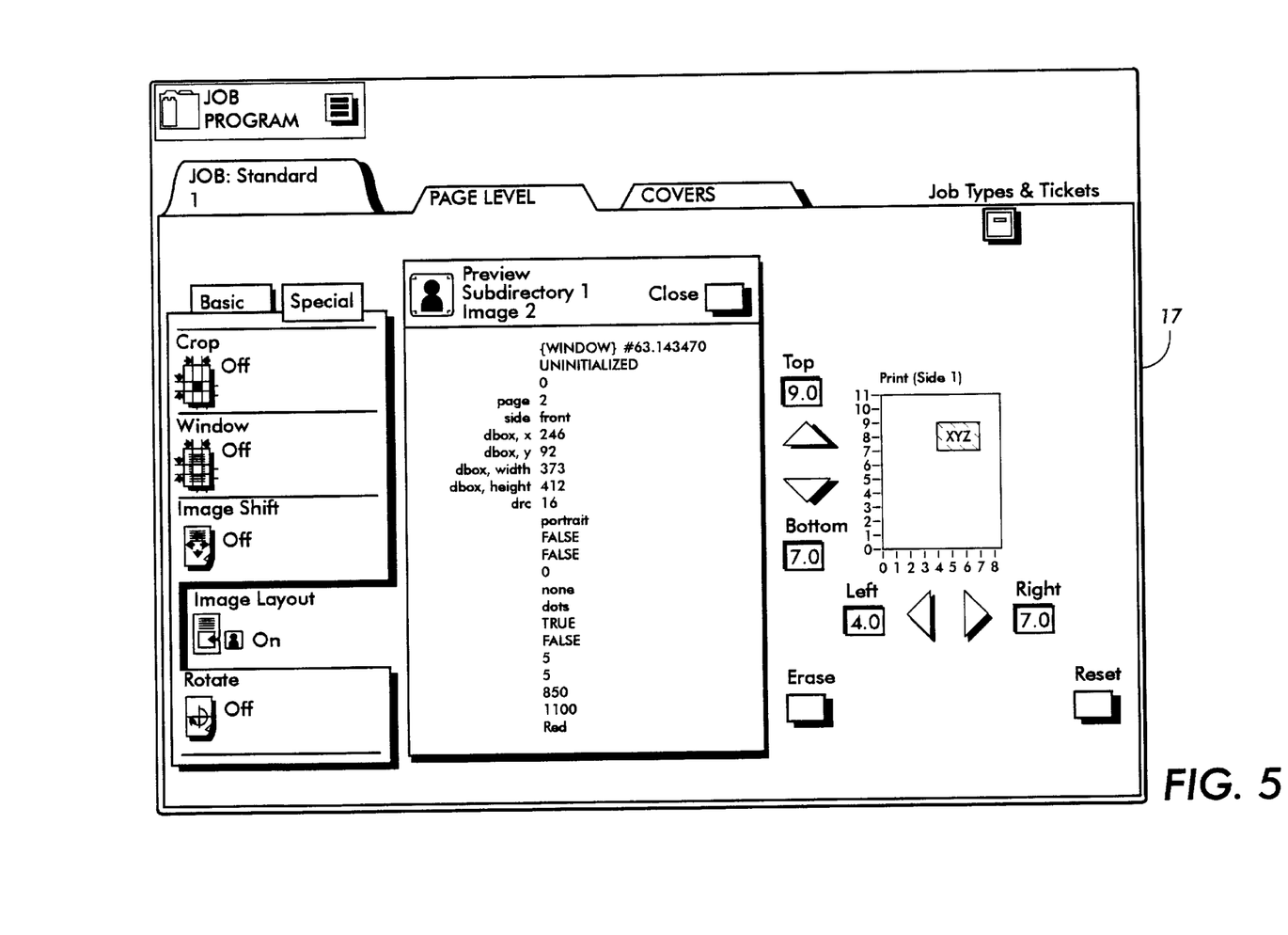

Examples of job ticket displays suitable for use in a network printing environment are shown in figures. 4 and 5 of the drawings. In particular, referring to FIG. 4, jobs are programmed in a Job Program mode in which there is displayed on the screen 17 (FIG. 1) the job ticket 35 with a job scorecard 37 for the job being programmed. Job ticket 35 displays various job selections available for programming, while job scorecard 37 displays the basic instructions to the system for printing the job. Various job ticket types are provided, with access by means of Job Types and Tickets icon 39.

Job Ticket 35 has three programming levels, referred to as "Job Level", "Basic", and "Special", each having a series of icons for accessing the various programming selections available at that level. The scorecard 37 is, in the illustrated embodiments of FIGS. 4 and 5, associated with each programming level so that on activation of a particular job/page level or of a specific icon, the appropriate scorecard 37 is displayed on screen 17. It will appreciated that certain aspects of programming, while shown as being at "Page Level" in FIG. 4, facilitate the layout of a specific image, e.g. bitmap, which image typically has its own set of specific attributes.

More particularly, as shown conjunctively by FIGS. 4 and 5, through use of the special scorecard in conjunction with an attribute file for an image or bitmap—the bitmap being represented in FIG. 5 as the label "XYZ"—layout work for a prestored bitmap can be accomplished readily. The sort of layout work suggested by FIG. 5 is described, in detail, by U.S. Pat. No. 5,450,541 ("Method of Applying Electronically Stored Labels to a Print Job" ) As will be further appreciated by those skilled in the art, the preferred embodiment contemplates that a bitmap call system, of the type disclosed by U.S. Pat. No. 5,493,634, can be used to designate, at a client workstation, which of the bitmaps, stored at a remote network server/printer are to be applied to one or more pages of a job. As will appear below, a client user, in one example, would access the bitmap of "Subdirectory 1" (FIG. 5) at the remote network server/printer and provide all of the information necessary to eventually print the prestored bitmap XYZ.

Referring again to FIG. 2, the server 25 includes one or more queues 42-1, 42-2, . . . 42-N, the queues (e.g. print queues) 42 being provided, for selection by the user, on a section or file 43. Each of the queues 42 is mapped to one of configuration files or profiles (e.g. print profiles) 44-1, 44-2, . . . 44-n. Each of the printer profiles includes a list of printer properties, the properties, in one example, being arranged advantageously to describe the combinations of job selections available at a selected one of the printers or family document processing units 12.

Each of the print queues 42 is associated with one or more of the document processing units or printers 12. It should be recognized that there may be plural queues for the same printer, as in the case where virtual printers are provided. Accordingly, in a second example, a printer (referred to herein as virtual printer) may be set up to provide different printer functions, with a corresponding print queue and profile provided for each different printer setup.

In the preferred embodiment the queues 42 communicate with a queue utility 48. As will appear from the description below, the queue utility is provided with the software necessary for permitting attribute information of a job to be parsed and arranged in a database 50. Corresponding image components are preferably stored in mass memory (not shown). Both of the queue utility and the database communicate with a main server control 52, the main server control being responsible for providing the queue utility with necessary processing capability facilitating the movement of data between the queue utility, database and queues. Functionality of the queue utility will be discussed in further detail below.

Referring still to FIG. 2, preferably, the electronic documents 39 are placed in a document directory 54. In one example, the server control 52 combines a set of documents 39 with a corresponding combination of print job selections to form a document job. One example of a server processor capable of combining a set of electronic documents, such as a print data (page description language) file and a corresponding combination of print job selections, such as a job ticket, into a job file for printing can be found in U.S. Pat. No. 5,226,112 to Mensing et al. (Issued: Jul. 6, 1993) Other arrangements well suited for managing jobs on a network level can be found in U.S. Pat. Nos. 5,113,494 (disclosing a server processor suitable for RIPing a document), U.S. Pat. No. 5,220,674 (disclosing a server with various levels control as well as database with attendant management), and U.S. Pat. No. 5,483,653 (disclosing a server with a parser and storage).

Figure 6:
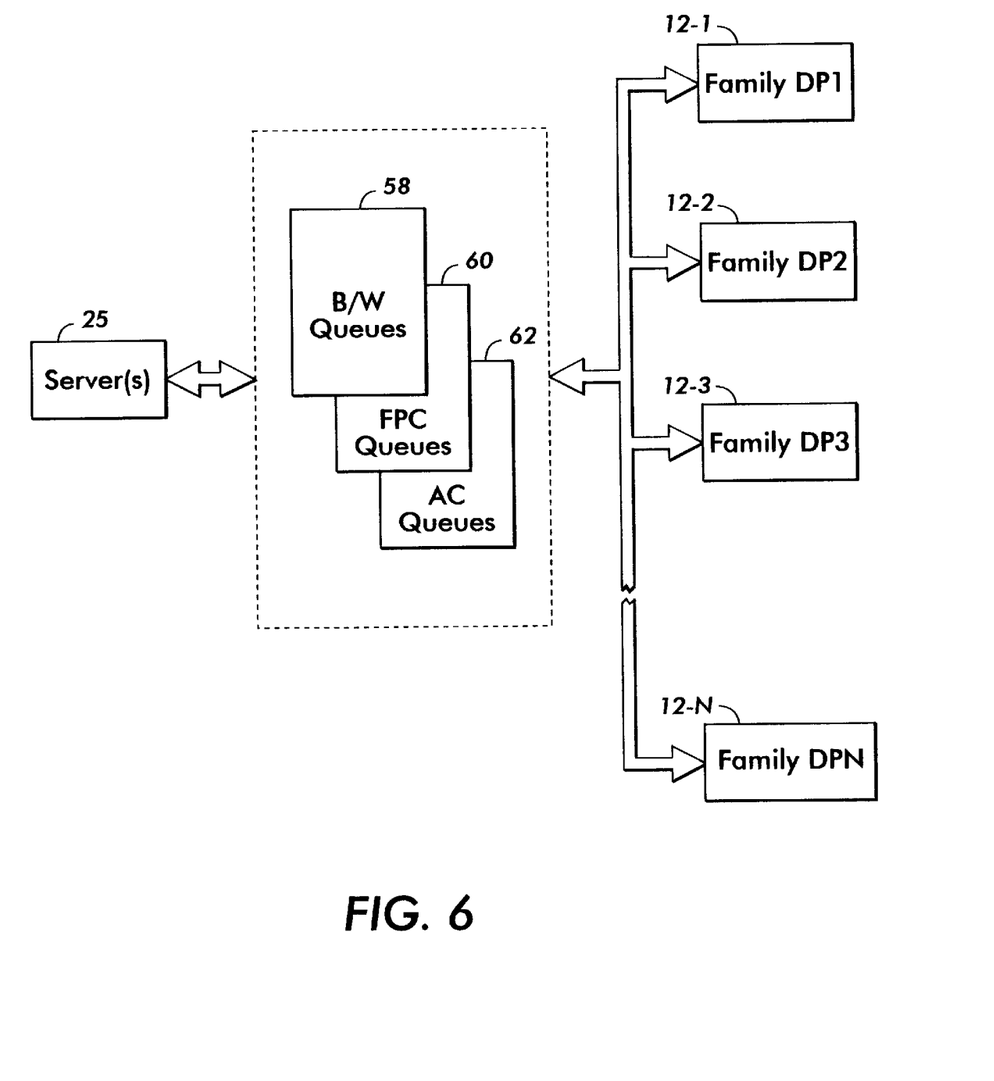
FIG. 6 is a schematic, block diagram based on the embodiment of FIG. 2 in which queues are grouped on the basis of functionality.
Figure 7:
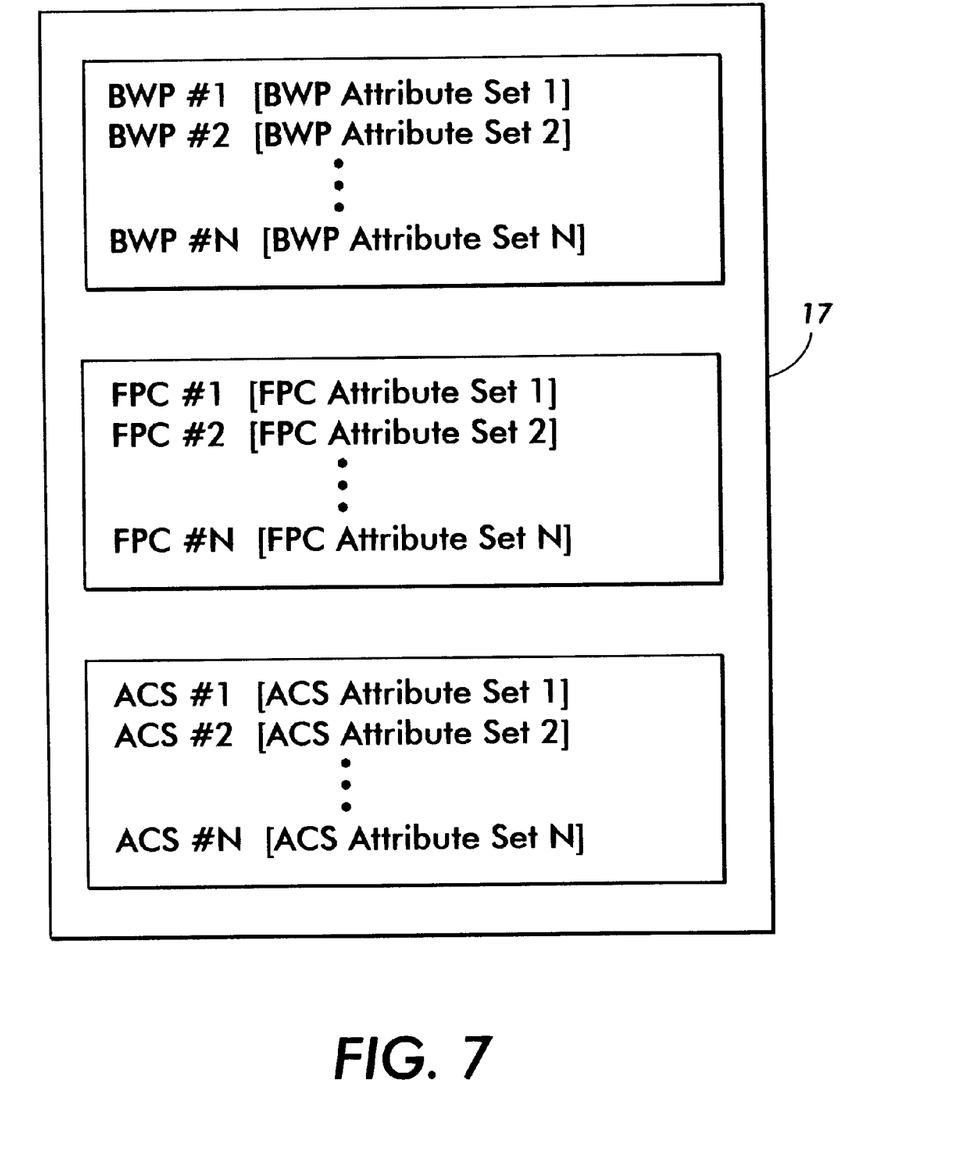
FIG. 7 is an elevational view of a screen in which available queues, grouped in terms of functionality, are displayed.

Referring to FIGS. 6 and 7, the preferred queue structure of the present approach is discussed. In the illustrated embodiment of FIG. 6, the queues are organized into three groups, namely a black and white print queue group ("B/W Queues") 58, full process color print queue group ("FPC Queues") 60 and accent color print queue group ("AC Queues") 62. As will be appreciated by those skilled in the art, while three queue groups are shown in FIG. 6, the preferred embodiment contemplates the use of as many queue groups as is required to meet the demands of the system users.

Preferably the various groups are mapped to one or more servers disposed throughout the network document processing system, and referring specifically to FIG. 7, each group includes a list of queues corresponding with various network printers. As should be recognized, the printers can be grouped in terms of families, the concept of families being described further in U.S. Pat. No. 5,450,571. As should be also recognized, the families referred to in FIG. 6 need not be printers, but rather can be a host of document processing devices typically found in a distributing document processing or printing system. As follows from the discussion of queue mapping above, the various queues of the queue groups can be mapped to the document processing components or families in a manner that optimizes the individual requirements of the system users.

Figure 8:
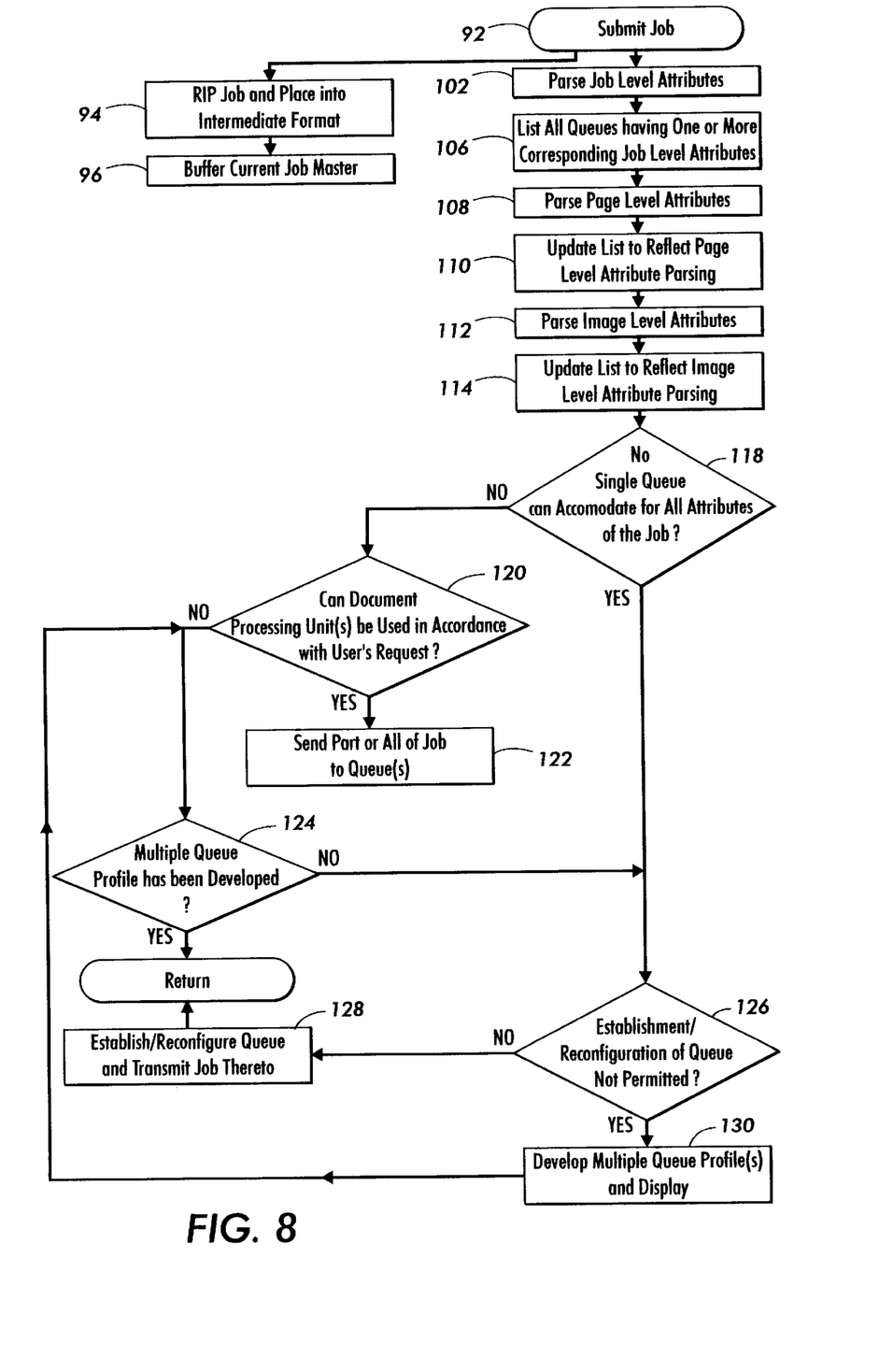
FIG. 8 is a flow diagram demonstrating an approach in which an attribute profile for a job is developed for determining the one or more queues to which a job is to be delivered.

Referring to FIG. 8, a software implementation for distributing one or more job portions of a job among one or more queues based on the attributes of the job is disclosed. In general, the technique proposes an approach in which attribute information associated with a job, i.e. attribute information embedded in an electronic document and corresponding job ticket, is "parsed" and used to dynamically generate a list or matrix of queues available for processing at least a portion of the job. One or more queues are then selected, on the basis of the list or matrix, to execute one or more portions of the job.

In the illustrated implementation of FIG. 8, which could be employed in a standalone network server of the type disclosed above or a server coupled with a printing apparatus of the type disclosed in now-allowed Pat. application Ser. No. 08/315,274, a job is submitted to the server at step 90. The job, i.e. the electronic document and job ticket associated with the job, is then parsed, at step 92, for information relating to job level attributes (i.e. J1, J2, . . . JN). As will be appreciated, parsing may include nothing more than scanning the job ticket and the electronic document (also referred to as "job master") to glean necessary attribute information.

In conjunction with parsing, the job may be placed into a form suitable for editing. It will appreciated that a job, when in a PDL format, is not readily edited. Thus to facilitate editing, the job is placed into an intermdiate format (step 94), e.g. such as TIFF or any other suitable editable format. It should be appreciated that the preferred embodiment contemplates the placing of the job into an intermediate format, whether the job is to be edited or not, because to do so, among other things, facilitates print-on-demand preparation of the job. RIPing of the job to place it into an intermediate format can be achieved readily with a platform of the type disclosed in U.S. Pat. Nos. 5,113,494 and 5,220,674. Once the job is in a suitable intermediate format, it may be buffered (step 96) so that appropriate editing procedures, of the type alluded to below relative to the discussion of FIG. 11, can be executed therewith. As will be appreciated by those skilled in the art, in one example the intermediate format would permit editing at an object oriented level in which image components or objects could be added to or deleted from the document job.

Figure 9:
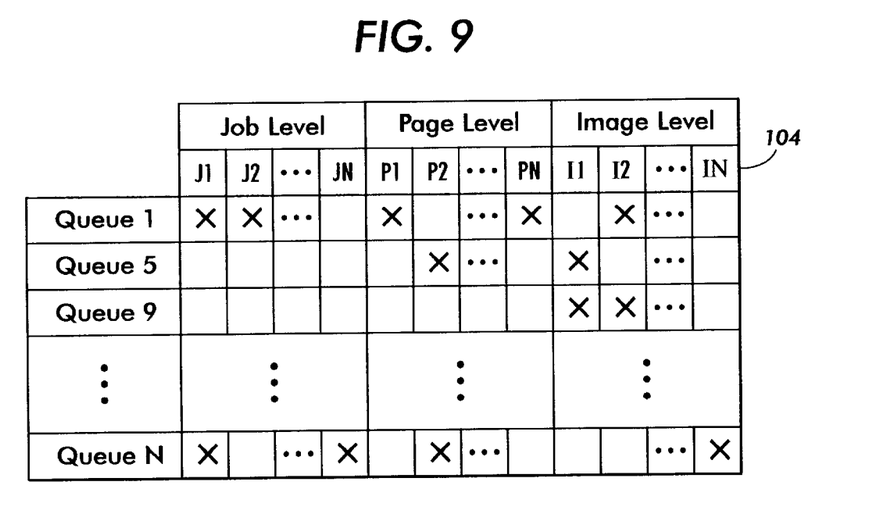
FIG. 9 is a schematic view of an attribute profile for a job.

Referring again to step 92, in practice, the job level attribute information is buffered (FIG. 2) and compared with the information made available by the configuration files 44. Upon determining that an attribute of the job corresponds with an attribute of a queue, a line is developed in a matrix 104 (FIG. 9), via step 106. Each queue capable of processing at least a portion of the job, based on a match between at least one job level attribute and one configuration file attribute, is listed in matrix 104. As shown in the illustrated matrix of FIG. 9, as a minimum, queues 1 and N are capable of executing at least a portion of the job at a job level.

At step 108, the job is further parsed to determine what page level attribute information (P1, P2, . . . PN) might exist. With a resulting list of page level attributes another comparison is made with the configuration files to update the matrix 104 (step 110) for reflecting which queues are capable of executing at least a portion of the job based on page level attributes. As shown in the illustrated matrix of FIG. 9, as a minimum, queues 1, 5 and N are capable of executing at least a portion of the job at a page level.

At step 112, the job is further parsed to determine what image level attribute information (I1, I2, . . . IN) might exist. With a resulting list of image level attributes another comparison is made with the configuration files to update the matrix 104 (step 114) for reflecting which queues are capable of executing at least a portion of the job based on image level attributes. As shown in the illustrated matrix of FIG. 9, as a minimum, queues 1, 5, 9 and N are capable of executing at least a portion of the job at an image level.

Referring now to step 118, a subroutine for determining which one or more queues should be used to execute the job is begun. Assuming that one or more single queues are available for executing the entire job completely, an interactive determination as to whether the document processing unit(s) mapped to the single queue(s) is suitable for executing the job is made at step 120. In one example a client user is queried by the server, in accordance with an interactive scheme of the type disclosed in U.S. Pat. No. 5,129,639, to ascertain whether selected attributes of a document processing unit associated with one or more queues is acceptable to the user.

As can be understood, there are certain circumstances in which a user may find the available single queue(s) unsuitable to execute his/her job. For example, each available document processing unit(s) may be disposed at a location that is unsuitable for the user or each available processing unit may be rated at an unacceptable processing speed (e.g. the print per unit time is unacceptably low). Preferably, at step 122, if a document processing unit meets the requirements of the user, all of the job is communicated to a queue corresponding with the document processing unit. On the other hand, if no queue is available that can meet the user's demands, then the user is provided, at step 124, an opportunity to develop a multiple queue profile or simply initiate a return.

Assuming that the user opts to develop a multiple queue profile or that no single queue is available for processing the job, the user is, under certain circumstances, provided with an opportunity to establish a new queue or reconfigure a preexisting queue (see step 126). If the user is empowered to establish or reconfigure a queue, then the process proceeds to step 128 where the user performs a necessary establishment/reconfiguration operation and communicates the job to the established/reconfigured queue. In some circumstances it may be desirable to provide a user with the power to manipulate queue. Indeed, a certain degree of queue manipulation is contemplated by Xerox' XNS Print Protocol or MIT's Palladium Print Paradigm. In many situations, however, it may be quite undesirable to provide a user with queue manipulation power. That is, permitting a system administrator to manipulate queues may be acceptable while permitting a less educated user to manipulate queues may be quite unacceptable.

Figure 10:
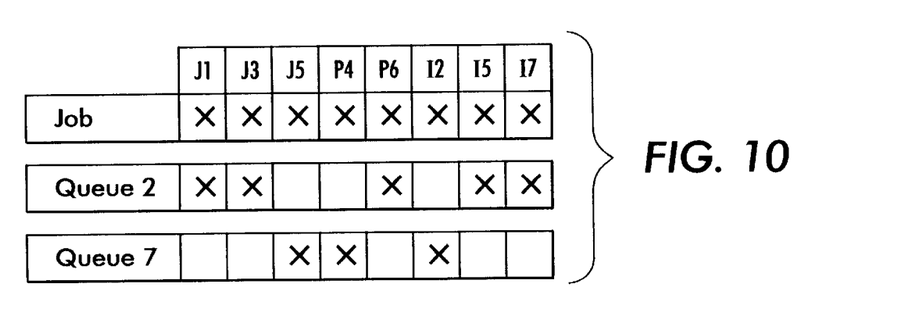
FIG. 10 is a schematic view of a job attribute summary compared against two rows from a job attribute profile.

For those situations in which establishment/reconfiguration is not permitted, a user is willing to explore the possibility of a multiple queue profile, the process proceeds to step 130 where the queue utility 48 (FIG. 2) automatically and dynamically develops one or more multiple queue profiles from which the user can choose. Referring to FIG. 10, an example of the development of a multiple queue profile is discussed. In particular, an exemplary job may be characterized by the following attribute set:

{J1, J3, J5, P4, P6, I2, I5, I7}

For the situation in which a single queue with this attribute set does not exist and a multiple queue profile is requested, the queue utility searches the matrix 104 (FIG. 9) for two complementary queues. In the example of FIG. 10, the following attribute set of Queue 2:

{J1, J3, P6, I5, I7} complements the following attribute set of Queue 7:

{J5, P4, I2}

To implement the above exemplary multiple queue profile development, the queue utility searches the matrix 104 (FIG. 9) for two complementary queues and, via step 130, apprises the user of each set of queues available to execute the user's job.

A situation well suited for a multiple queue profile exists when a job includes a black/white portion and one or more color type portions. In one example, the job may include multiple color types, such as both process color and accent/highlight color. In these situations, it is preferable to send the black/white portion to one queue and the multiple color portion to one or two other queues. While the accent color portion could be communicated to a queue with both black/white and accent color capabilities, it could also be sent to two queues (one queue with black/white capability and another queue with accent color capability) mapped to a single printer.

Figure 11:
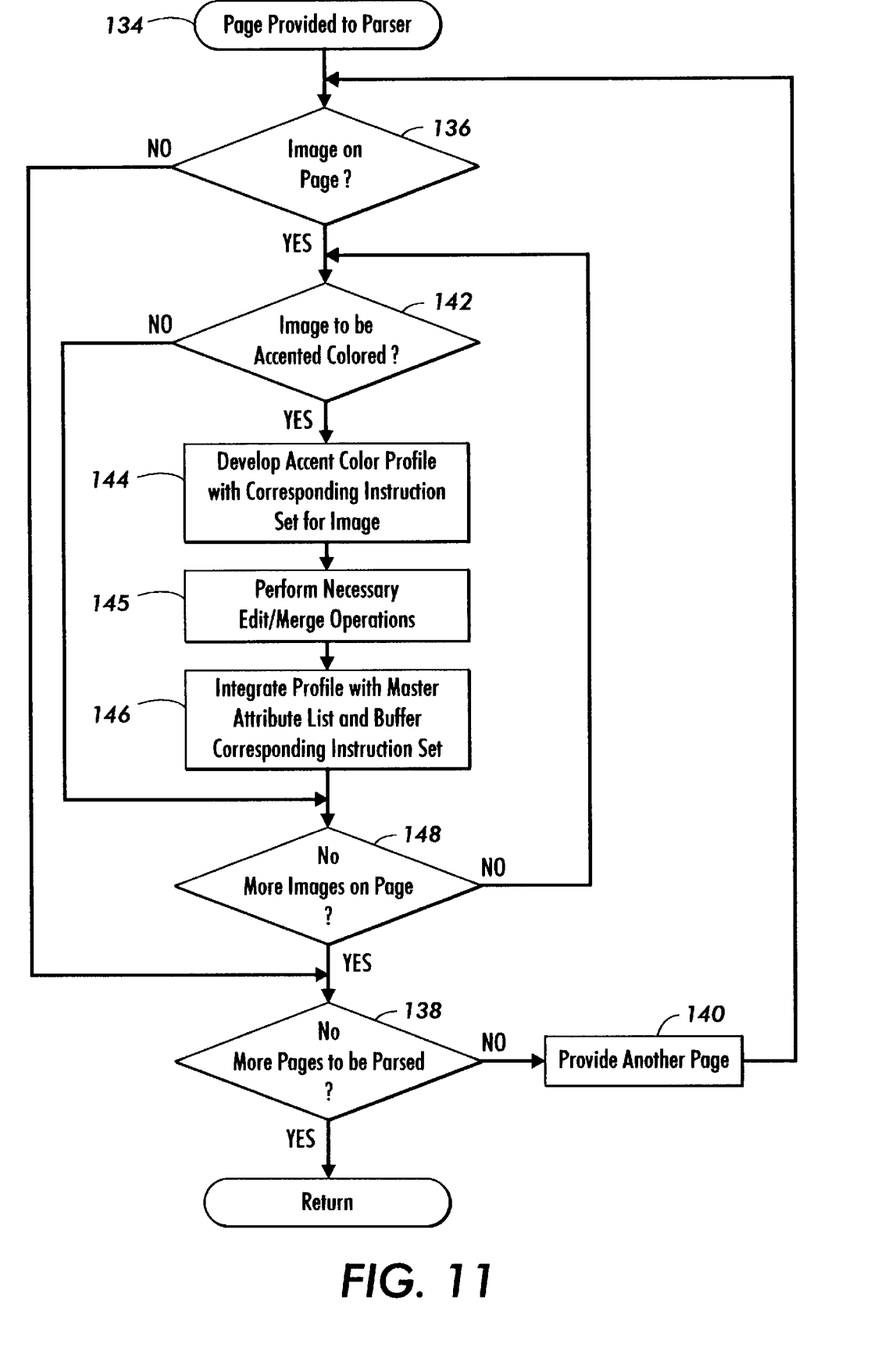
FIG. 11 is a flow chart demonstrating how a job is parsed to obtain selected attributes from a job calling for the application of accent color.

Referring specifically 11, an approach for handling the accent color portion of a job is discussed in further detail. Preferably, a page is provided to the queue utility 48 (FIG. 2) (step 134) and parsing proceeds as described above. A determination is made, at step 136, as to whether an image exists on the provided page. If there is no image, i.e. no bitmap or raster, on the page, then the process proceeds to step 138 of determining whether the entire job has been parsed. Assuming that the entire job has not been parsed, then another page is obtained (step 140), and the process loops back to step 136.

If an image exists on the page, then a determination is made, via step 142, to determine if the image is an accent color image, e.g. a color merge item. Assuming that the image comprises an accent color image, a profile, with a corresponding instruction set, is developed at step 144. Generally, the accent color profile will include (as shown, for example in FIG. 5) information regarding, among other things, page positioning, image positioning, color, and printing control. As should be recognized, print control would include information for controlling print head operation so that operations such as overlay, annotation, alternate color printing could be obtained. In overlay operations a color can be applied on top of a text portion to highlight the text, and in alternate color printing, color application can be alternated by squirting one ink from a head during one time interval and another ink from the same head during another time interval. It will be appreciated that the preferred embodiment comprehends the achievement of alternating color with any suitable printable format material, e.g. developer material.

In one application, all of the accent color information can be provided for an image by the server 25 or by a client. Preferably, the accent color profile for a given page includes an accent color pattern and corresponding data. In one example, the accent color pattern is specified by up to eight stripes distributed evenly across a page with each stripe being described by data relating to location, height and color. In practice, a server operator or client generates a file and the data for the pattern is generated with a stripe data generator utility. The stripe data generator utility generates a suitable stripe bitmap by accommodating for, among other commands, Line, Box Text String and Bitmap commands. Each page in the job may have a stripe pattern associated with it and the data may vary from page to page. In the one example, a user would indicate location of an image for a given page by designating a specific stripe and where, within the stripe, a raster (having a specific color) is to appear.

When accent color is programmed by a client, the accent color information may be provided by way of a suitable known application, such as Word, Pagemaker or PowerPoint ("Word" and "PowerPoint" are trademarks attributable to Microsoft products while "Pagemaker" is a trademark attributable to an Adobe product). The colors used by the client should be representative of an end result but are not required to calorimetrically accurate. All objects, e.g. text, graphs, charts, pictures, tables, meant to be black/white should be created as such and all objects meant to be colored should be created (colored) as such.

The client then, with an appropriate driver converts the information regarding the accent color specifications into job form using standard L2 Adobe PostScript encoder at his/her workstation. All of the client operations, with respect to accent color can be performed at the server 25 (FIG. 2) instead of at the client. In this way, a merge item, e.g. logo, can be added to a document even when the client has not called for it. This server capability may be useful for the case in which the server employed by an institution, e.g. university, that desires to designate the source of a document even when the client has not thought to do so.

Referring still to the illustrated embodiment of FIG. 11, operations necessary to execute editing operations of the type described above are performed, for a given image, at step 145. It will be appreciated that each time an editing operation is performed, revisions of the job copy buffered at the server (see e.g. step 98 of FIG. 8) must be updated appropriately. Additionally, each profile developed for an accent color image is, at step 146, integrated into the matrix 104. In this way, the queue profile for the entire job can reflect those attributes associated with the accent colored pages. Decisions 138 and 148 permit the process to either analyze the job further for one or more accent colored images or opt out of the parsing subroutine.

Figure 12:
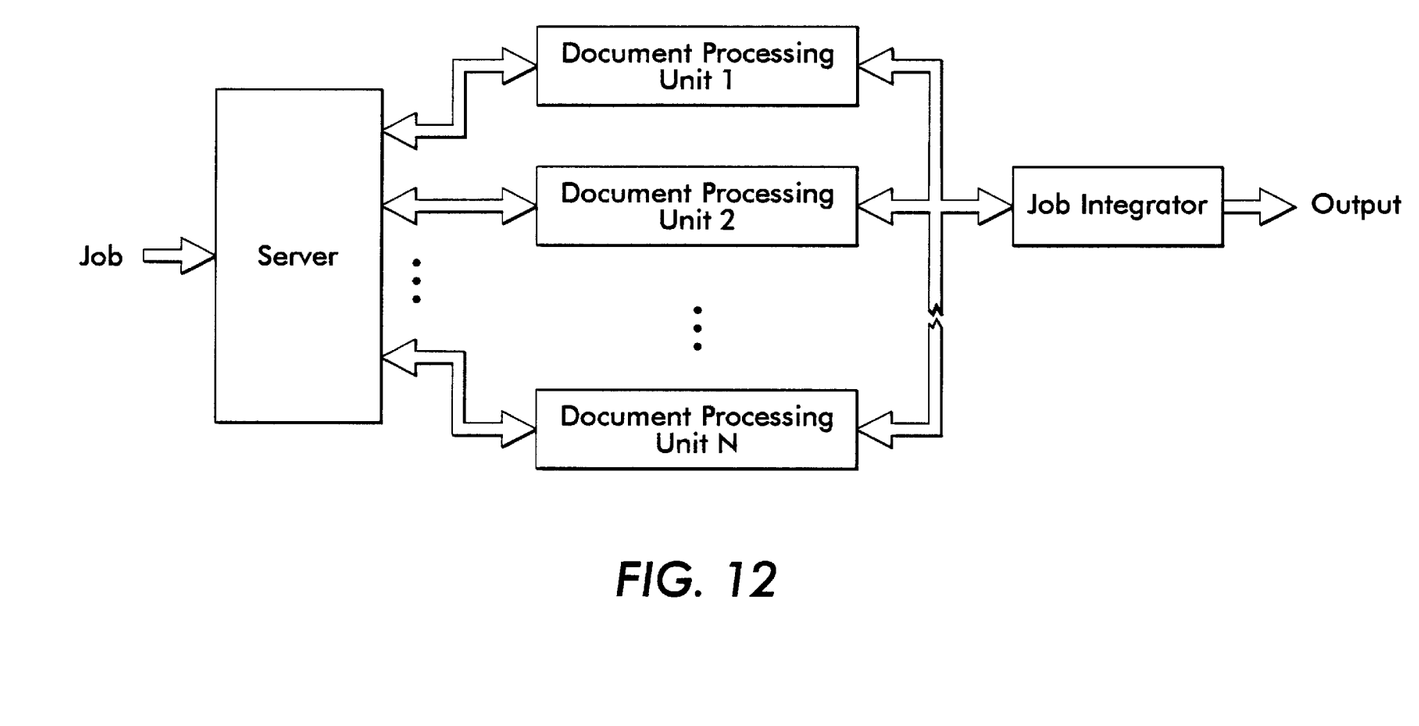
FIG. 12 is a schematic block diagram of a printing system capable of integrating multiple job portions into a single output.

Referring now to FIG. 12, an example for processing a job including black/white, full process color and accent color portions is shown. In particular, one portion of the job may be delivered to a full process color printer (document processing unit 1) and another portion may be delivered to a black/white printer with accent color capability (document processing unit 2). As should be appreciated, document processing unit 2 preferably includes the components, e.g. data base, mass memory and system state controller, necessary to store image data associated with job as well as all necessary printing instructions and page level templates (programmed stripe patterns). In turn the job is scheduled to 1) generate the black/white prints, 2) accent the black/white prints with one or more colors and deliver both the black/white prints and accent colored prints to a job integrator in the form of a stream.

In practice, the scheduling capabilities of U.S. Pat. Nos. 5,095,342 and 5,184,185, the disclosures of which are incorporated herein by reference, would be used in conjunction with a suitable color accenting device disposed near the output end of document processing unit 2 to develop a print output stream of black/white and accent colored prints. The data for the accent colored pages as well as any accompanying control instructions for operating the accent coloring device would be obtained from mass memory of document processing unit 2—the control instructions being communicated to the document processing unit 2 previously by the server 25 of FIG. 2. Additionally, "holes" would be provided in the stream, in accordance with the scheduling procedure of U.S. Pat. No. 5,489,969 for receiving color process prints delivered to the job integrator. As illustrated by the Soler patent, the color prints can be fed from a tray into the stream of prints provided by the document processing unit 2.

In one example the color prints would be delivered directly from the document processing unit 1 to the job integrator by way of a suitable conveyor system. In such exemplary approach, the prints would be delivered to the top of one of the integrator trays and the system would be notified of their arrival. In turn the job corresponding with the delivered color prints would be designated as an interrupt job and printing of the current job would be interrupted so that the job corresponding with the delivered color prints could be printed immediately. In this way, the color prints would not be delivered inadvertently to job being currently processed.

Numerous features of the above-described embodiment can be appreciated readily by those skilled in the art:

First, an arrangement, including a plurality of queues and a queue utility for examining the attributes of a job, is provided. Pursuant to examining the job attributes, a matrix, indicating each of the queues that is capable of processing at least a portion of the job completely is developed. By reference to the matrix, the queue utility determines one or more quenes from the plurality of queues, to which one or more portions of the jobs is to be provided.

Second, the matrix is developed by reference to a full range of job attributes. A job can be characterized in terms of job level attributes, page level attributes and image level attributes. A number of known arrangements partition a job based on job level attributes and at least one known arrangement partitions a job based on page level attributes. The preferred embodiment parses a job for purposes of generating a matrix based on job, page and image level attributes. Accordingly, partitioning of the job, by reference to the matrix, may accommodate for attributes other than job and/or page level attributes.

Third, in one approach of the preferred embodiment the queues are grouped as a function of the type of document processing subsystem with which a given queue is mapped. For instance, black/white printing machines are grouped in a first set, full process color printing machines are grouped in a second set and accent/highlight color printing machines are grouped in a third set. In this one approach, a first portion of a job can be provided to one queue set while another portion of the job can be provided to another queue set.

Finally, the preferred embodiment sets forth an approach that greatly facilitates a multi-dimensional color printing system which is both dynamic and flexible. In particular, a client desirably delivers a job to a server which analyzes the job, in a manner that is transparent to the client, and, when necessary, partitions the job for delivery to multiple printers. If accent colored pages are present in the job, the server coordinates printing of the accent colored pages by delivering all of the necessary data and instructions to a printing machine chosen dynamically by the server. In one example, the server can add a color merge item to portions of a job for marking the source of the job even when the user has only implicitly indicated a desire to have the merge item added.

What is claimed is:

1. A document processing system including at least one document reproduction apparatus and managing on-demand output of a document job including an electronic document with multiple pages, the document job being characterized by both a set of job level attributes with each job level attribute relating to a manner in which the document job is to be processed by the document processing system and a set of page level attributes with each page level attribute relating to a manner in which each page of the electronic document is to be processed by the document processing system, the document processing system further including a document server for managing conversion of the document job into the on-demand output, comprising:

a plurality of queues mapped to a plurality of document processing subsystems, each of the plurality of queues including a set of queue attributes characterizing the extent to which each document processing subsystem mapped to one or more of said plurality of queues is capable of processing a job portion delivered to the one or more queues;

a queue utility communicating with said plurality of queues for parsing the document job to obtain the set of job level attributes and parsing the electronic document to obtain the set of page level attributes, said queue utility comparing both the set of job level attributes and the set of page level attributes with each set of queue attributes to generate a set of information corresponding both the set of job level attributes and the set of page level attributes with those queues, among said plurality of queues, that are capable of completely processing at least a portion of the document job; and using the set of information generated by said queue utility to correspond a first portion of the electronic document to a first one of the plurality of queues for execution at a first one of the plurality of document processing subsystems and a second portion of the electronic document to a second one of the plurality of queues for execution at a second one of the plurality of document processing subsystems.

2. The document processing system of claim 1, wherein the first one of the plurality of document processing subsystems comprises a printing system for printing an image with multiple colors and the second one of the plurality of document processing subsystems comprises a printing system which would normally mark a substantial portion of a document job with just black developer material or ink.

3. The document processing system of claim 2, wherein the printing system which would normally mark a substantial portion of a document job with just black developer material or ink includes a subsystem for accenting a print with a nonblack color developer material or ink.

4. The document processing system of claim 1, wherein the second one of the plurality of document processing subsystems comprises a subsystem for applying a nonblack accent color to a print marked, at least in part with black developer material or ink.

5. The document processing system of claim 1, wherein the set of information comprises a matrix in which each column or row designates an extent to which a portion of the document job can be processed completely with one of the plurality of document processing subsystems.

6. The document processing system of claim 5, wherein a decision to provide separate portions of the document job to multiple ones of said plurality of queues, respectively, is made on a basis of a relationship between at least two of the matrix columns or at least two of the matrix rows.

7. The document processing system of claim 1, wherein substantially all of the on-demand output is generated at just one of the plurality of document processing subsystems.

8. A document processing system including at least one document reproduction apparatus and managing on-demand output of a document job including an electronic document with multiple pages, the document job being characterized by both a set of job attributes with each job attribute relating to a manner in which the document job is to be processed by the document processing system and a set of page attributes with each page attribute relating to a manner in which each page of the electronic document is to be processed, the document processing system further including a document server for managing conversion of the document job into the on-demand output, comprising:

a first set of one or more queues mapped to a first set of document processing subsystems, each of said first set of one or more queues including a set of queue attributes characterizing the extent to which each document processing subsystem mapped to one or more of said first set of queues is capable of processing a job portion delivered to the one or more queues of said first set of queues, and each of the first set of document processing subsystems being part of a first family of document processing subsystems;

a second set of queues mapped to a second set of document processing subsystems, each of said second set of queues including a set of queue attributes characterizing the extent to which each document processing subsystem mapped to one or more of said second set of queues is capable of processing a job portion delivered to the one or more queues of said second set of queues, and each of the second set of document processing subsystems being part of a second family of document processing subsystems;

a queue utility communicating with said first and second sets of queues and comparing both the set of job attributes and the set of page attributes with each set of queue attributes to generate a set of information corresponding both the set of job attributes and the set of page attributes with those queues, among said first and second sets of queues, that are capable of completely processing at least a portion of the document job; and using the set of information generated by said queue utility to correspond a first portion of the electronic document with one of said first set of one or more queues and a second portion of the electronic document with one of said second set of queues.

9. In a document processing system including at least one document reproduction apparatus and managing on-demand output of a document job including an electronic document with multiple pages, the document job being characterized by both a set of job level attributes with each job level attribute relating to a manner in which the document job is to be processed by the document processing system and a set of page level attributes with each page level attribute relating to a manner in which each page of the electronic document is to be processed by the document processing system, the document processing system further including a document server for managing conversion of the document job into the on-demand output, a method comprising:

mapping a plurality of queues to a plurality of document processing subsystems, each of the plurality of queues including a set of queue attributes characterizing the extent to which each document processing subsystem mapped to one or more of the plurality of queues is capable of processing a job portion delivered to the one or more queues;

parsing the document job to obtain both the set of job level attributes and the set of page level attributes;

comparing both the set of job level attributes and the set of page level attributes with each set of queue attributes to generate a set of information corresponding both the set of job level attributes and the set of page level attributes with those queues, among the plurality of queues, that are capable of completely processing at least a portion of the document job; and the set of information generated by a queue utility to correspond a first portion of the electronic document to a first one of the plurality of queues for execution at one of the plurality of document processing subsystems and a second portion of the electronic document to a second one of the plurality of queues for execution at a second one of the plurality of document processing subsystems.

10. The method of claim 9, wherein said parsing includes parsing the document job at a first time to obtain the job level attributes of the document job and parsing the document job at a second time to obtain the page level attributes of the electronic document.

* * * * *